United States Patent [19]

Dimitracopoulos

[11] 3,960,119
[45] June 1, 1976

[54] INTERNAL COMBUSTION ENGINE
[76] Inventor: Panayotis C. Dimitracopoulos, Lyford Cay, P.O. Box N-7776, Nassau, Bahamas
[22] Filed: Dec. 17, 1974
[21] Appl. No.: 533,706

[52] U.S. Cl. .................. 123/32 C; 123/191 SP
[51] Int. Cl.² ................................. F02B 23/00
[58] Field of Search .......... 123/32 C, 32 ST, 32 V, 123/32 VN, 191 S, 191 SF, 33 D, 32 D

[56] References Cited
UNITED STATES PATENTS

| | | | |
|---|---|---|---|
| 1,499,794 | 1/1924 | Wennerby | 123/32 VN |
| 1,620,124 | 3/1927 | Nielsen | 123/32 V |
| 2,071,241 | 2/1937 | Thomas | 123/33 D |
| 2,587,339 | 2/1952 | Du Rostu | 123/32 ST |
| 2,779,320 | 1/1957 | Göschel | 123/32 V |
| 3,621,821 | 11/1971 | Jarnuszkiewicz | 123/32 ST |
| 3,623,460 | 11/1971 | Komaroff | 123/32 JV |
| 3,815,566 | 6/1974 | Staggs | 123/32 C |
| 3,875,909 | 4/1975 | May | 123/191 S |

FOREIGN PATENTS OR APPLICATIONS

| | | | |
|---|---|---|---|
| 643,216 | 9/1928 | France | 123/32 V |
| 130,736 | 8/1919 | United Kingdom | 123/32 V |
| 347,541 | 11/1927 | United Kingdom | 123/32 V |

*Primary Examiner*—Charles J. Myhre
*Assistant Examiner*—Paul Devinsky

[57] ABSTRACT

In an internal combustion engine, large droplets of heavy fuel are injected in the combustion chamber in the presence of excess air and preferably under low pressure. The mixture of excess air and droplets of fuel is compressed and thereby forced to pass at high velocity through a vortex throat (i.e. small orifice) into an ignition chamber, where the friction between droplets and air causes self-ignition of the surface layers of the droplets. The combustion gases force the burning droplets, through the vortex throat, back into the combustion chamber under high velocity, thereby the burning surfaces of the droplets continuously come in contact with fresh supplies of air, until they burn substantially completely.

8 Claims, 3 Drawing Figures

INTERNAL COMBUSTION ENGINE

FIELD OF INVENTION

This invention relates to internal combustion engines and particularly to internal combustion engines operating under high compression ratios.

BACKGROUND OF THE INVENTION

It is well known that it is highly desirable to operate an internal combustion engine with the highest possible compression ratio.

It is also well known that the practical limit of such compression ratio is determined by the explosive detonation, and/or the ignition, of the fuel employed.

One of the reasons that such detonation occurs is that at ignition time some of the fuel "cracks" into explosively oxidizing components. Thus, instead of burning (hydroxylation), the fuel may crack into solid carbon, $H_2$, methane, etc., in which case the hydrogen will explosively oxidize.

Therefore, in order to avoid such detonation, practical internal combustion engines must operate under fairly low compression ratios which, in turn, substantially lower their efficiency.

Because of the detonation problem, even at low compression ratios, volatile fuels cannot be allowed to burn in excess air and are instead premixed in carburators or injected in intake manifolds or equivalent devices, always in the presence of limited quantities of air, thus insuring a low air-to-fuel ratio. This not only further lowers the efficiency, but also leaves substantial quantities of unburnt hydrocarbons. Consequently, such volatile fuels can only be compressed to relatively low pressures and are ignited in the combustion chamber with an electric discharge, such as that produced by the well-known spark plugs.

Heavier fuels are usually injected in the combustion chamber and since their cracking occurs at higher temperatures they may be compressed to correspondingly higher values. Nevertheless, since cracking and detonation will eventually occur, they are also compressed to a relatively low value and are ignited by a high temperature device, such as a glow-plug, glow-rod, glow-sphere, etc. To increase the efficiency and contain the detonation, fuels are sometimes injected and burned in precombustion chambers and similar or equivalent devices.

Heavy fuels, such as diesel fuel, are difficult to ignite. Therefore they are almost always injected as a fine mist, the reasoning being that the finer the mist, the larger the total surface of contact between fuel and air and therefore the easier the ignition and the better the combustion.

Thus, while high compression ratios are desirable, while self-ignition is also desirable, and while combustion in excess air is again desirable, none of these objectives can be practically realized according to prior art.

OBJECTS OF THE INVENTION

It is therefore the object of the present invention to provide internal combustion engines capable of operating under high compression ratios, in which the fuel is self-ignited under desired and controlled conditions and in which combustion occurs in the presence of excess air.

It is a further object of the present invention to provide internal combustion engines of substantially increased efficiency by making possible high precompression of air and fuel mixtures, the controlled self-ignition of the fuel and its controlled and substantially complete combustion without any appreciable cracking and therefore without detonation, thus also substantially decreasing the oxidation of nitrogen (i.e. decreasing the production of $NO_x$).

Other objects and advantages of the invention will become apparent from the ensuing description and claims and the accompanying illustrations.

SUMMARY

In an internal combustion engine, to prevent explosive detonation under high compression ratio, which detonation is caused by cracking of the fuel and the subsequent explosive oxidation of its components, the fuel is not broken up into a fine mist, as is the practice according to prior art, but is injected in the form of large droplets, under low pressure and in the presence of excess air in the combustion chamber. The droplets and air mixture is forced through a throated orifice into an ignition chamber where they enter at high velocities. The friction produced between droplets and air molecules, both moving at high velocities, causes the surface layers of the droplets to self-ignite. The pressure of the combustion gases forces back the burning droplets into the combustion chamber, where due to their high velocities they continuously come in contact with fresh supplies of air, thus burning substantially completely.

This arrangement and process make possible the operation of internal combustion engines, under high compression ratios and with greatly increased efficiency. The burning of fuel is substantially complete and therefore very small quantities of unburned hydrocarbons are released. Furthermore, since detonation is prevented, nitrogen has no chance to oxidize and therefore little or no $NO_x$ is produced.

DETAILED DESCRIPTION

Figure 1:
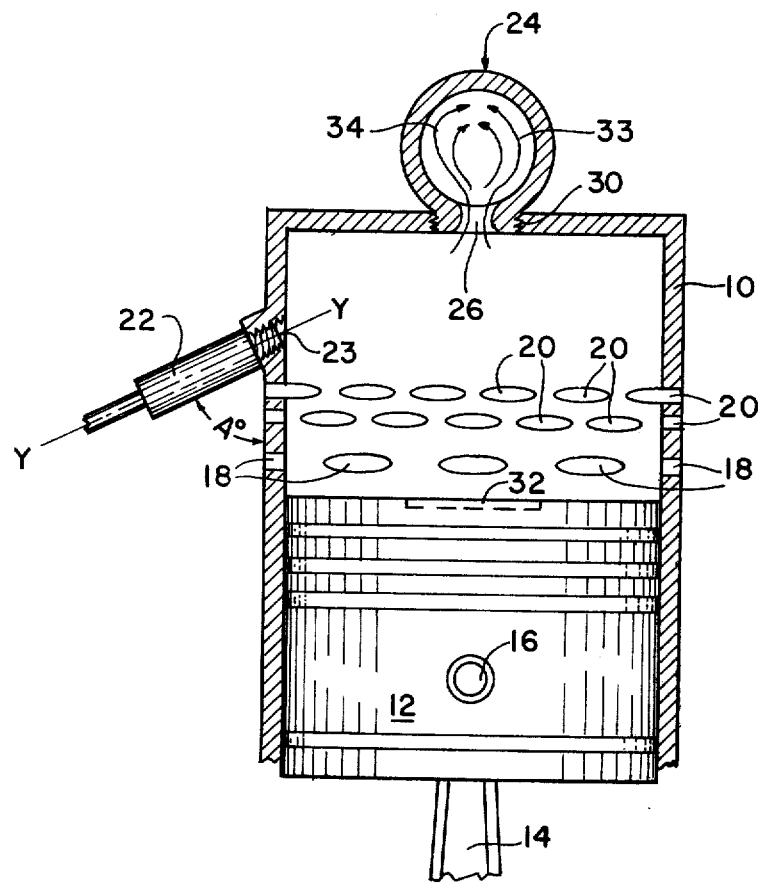
FIG. 1 is a sectional, elevational, view of a simple embodiment of the invention, which is employed for the description of the principles of the invention.

According to prior art and as previously explained, in order to promote combustion of hard to burn fuels, these fuels are injected into air in the form of a fine mist. The present invention radically departs from this principle, and instead:

I. A high flash-point fuel is broken up into large droplets of controlled size and mixed with a quantity of excess air.

II. The mixture (I) above is highly compressed but due to the relatively large size of individual droplets (which due to their size offer a small surface-to-volume ratio), heat penetrates slowly into their mass and therefore "cracking" is minimized, or eliminated for all practical purposes.

III. In addition, due to the relatively large size of the droplets self-ignition does not occur until further energy is supplied to the mixture in the following novel manner: Through a throated orifice, which will be referred to as "vortex throat," the combustion chamber communicates with an "ignition chamber." The size and shape of the vortex throat and ignition chamber are such that as the mixture of air and fuel droplets is compressed, it is forced into the ignition chamber at high velocities. The velocity thus imparted to the particles of the mixture provides the necessary additional energy to initiate self-ignition by friction. But due to the relatively large size of the droplets, combustion occurs at their surfaces only.

IV. The burning fuel droplets are not allowed to expand into the engine's combustion chamber (such as the cylinder), being carried by a stream of high velocity excess air, thereby burning fully, expanding and releasing their energy. It is significant to emphasize that by being carried by, and in, a stream of high velocity excess air, individual droplets continuously renew their contact with a fresh supply of air, thereby eventually burning completely. It is also important to emphasize that in this manner it is possible to obtain controlled combustion of fuel, i.e. control the time of combustion and thereby avoid detonation and greatly decrease the sudden stresses in the combustion chamber (cylinder) caused by the high pressures during detonation.

V. Since detonation is thus prevented and the fuel is burned completely under controlled conditions in excess air, the upper cylinder walls do not get coated with carbon, very small quantities of unburned hydrocarbon are released in the exhaust system, and since the large droplets are insensitive to detonation, nitrogen has no chance to oxidize and production of the objectionable $NO_x$ is greatly minimized (nitrogen oxidizes during the conditions and in the environment produced by detonation).

VI. Since large droplets of fuel are essential to the process (and not a fine mist according to prior art), low-pressure fuel injection is possible. Furthermore, such low-pressure fuel injection may be conveniently done at a relatively low position of the cylinder, i.e. at a considerable distance away from the top dead center of the piston, which means that the fuel-injection device may be very conveniently located on the wall of the cylinder and therefore shielded by the piston from the high pressures and temperatures which occur immediately after ignition.

The actual reduction to practice of the above-stated principles of the present invention may be realized in several ways and by a large number of physical devices and as an example of the practical embodiment possible, a simple, two-cycle, internal combustion engine incorporating the principles and teachings of the present invention will be described, reference being made to the accompanying drawings.

Piston 12 reciprocates in cylinder 10, in the well known manner, and through wrist pin 16 it is connected to connecting rod 14, the lower part of which is shown broken away as its actual shape has no bearing on the invention. The lower part of cylinder 10 is also shown broken away as it may be of any convenient design, its actual shape again having no bearing on the invention.

Air intake ports are designated by numeral 18 and may be arranged in a row, as shown in FIG. 1, although their actual shape and position is a matter of engineering considerations and design choice. Exhaust ports 20 may be also arranged in one or more rows, for example two rows, and may communicate with an exhaust manifold, not shown.

Fuel injector 22 is located on the cylindrical wall of the cylinder, so that its lengthwise axis Y-Y, passing through its nozzle 23 is inclined at an angle $A°$ which is less than 90°. In this manner, the fuel is injected through the wall of the cylinder and towards its upper end.

A novel "ignition chamber," generally designated by numeral 24, communicates with the cylinder through "vortex throat" 26. This ignition chamber may be an integral part of the cylinder, or it may be a separate component, conveniently secured to the cylinder for example by means of threads 30.

The operation of the engine is as follows: Air enters the cylinder through the intake ports 18 and is compressed by piston 12 as it moves towards its top dead center. Before piston 12 reaches nozzle 23, large droplets of fuel are injected in the cylinder by fuel injector 22 and the mixture of air and fuel droplets is further compressed to a considerable extent. The mixture has a high air content but, as explained above, the large droplets are difficult to self-ignite in this stage. As the piston moves towards its top dead center, the mixture is forced through the vortex throat 26 into the ignition chamber 24, at high velocities, which thereby provide the necessary additional energy to initiate self-ignition by friction. For example, mixture particles may travel in the ignition chamber 24 in substantially opposite directions, such as shown by arrows 33 and 34 and the friction thus generated between fuel droplets and air molecules will self ignite the surfaces only of the fuel droplets.

This self-ignition has been timed and arranged to occur at substantially the top dead center of the piston and therefore the expanding combustion gases are pushing the piston downwards in the known manner. It can be said that the ignition chamber and vortex throat act as a second, or additional, fuel-injection system but, at any rate, the burning fuel droplets continue to pass into the cylinder under high pressure and at high velocity, thereby continually coming in contact with a fresh supply of air, thus burning substantially completely.

This controlled combustion of large fuel droplets in excess air, without detonation, under high pressure, results in uncommonly high engine efficiency. Furthermore, as previously stated, burning being substantially complete, very small quantities of unburned hydrocarbons are released in the exhaust system and again, as previously stated, in the absence of appreciable detonation, there is hardly any $NO_x$ produced.

It must be noted that since the fuel-injection device and nozzle are located at considerable distance away from the top dead center of the piston, the fuel-injection device and its nozzle are very conveniently shielded away from the high temperatures and pressures which occur during combustion, especially immediately after ignition. Thus, low-pressure fuel injection, with its great advantages, is a practical possibility.

In order to protect the portion of the piston which faces the vortex throat, a temperature shield 32, made of suitable refractory material, may conveniently be added. Such temperature shield 32 is shown in dotted lines in FIG. 1.

The fuel injector may be of any convenient design, and as an example, a simple embodiment of such device of novel construction will now be described.

Figure 2:
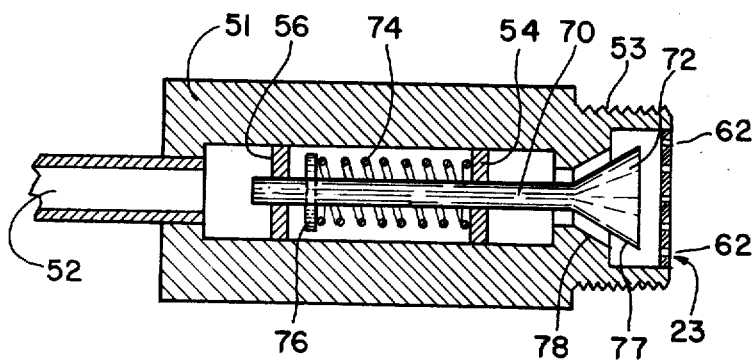
FIG. 2 is a longitudinal, sectional, view of a novel fuel injector, which may be optionally employed with engines built according to the invention.
Figure 3:
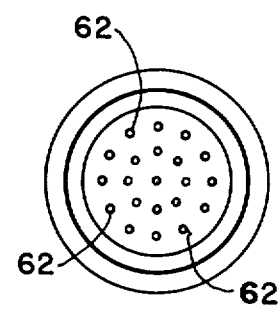
FIG. 3 is a front view of the novel fuel injector of FIG. 2, illustrating the nozzle end of the fuel injector.

Having in mind that fuel-injection must take place at low pressures and that the objective is to inject large fuel droplets in an atmosphere of excess air, the following design has substantial advantages while it is very simple. Referring to FIGS. 2 and 3 the housing 51 of the fuel injector may be cylindrical in shape, one end of which communicates with the fuel line 52 while the other end may terminate in a threaded portion 53 which may thus conveniently be threaded in the cylinder. The nozzle is generally designated by numeral 23 and consists essentially of a plate having a number of holes 62. The size of these holes 62 determine the size of the fuel droplets. The axially moving plunger consists of stem 70 coaxially secured to conical plug 72. The stem 70 may be conveniently supported by rings 54 and 56 and under the influence of a coil spring 74, one end of which rests against ring 54 while the other rests on pin or ring 76, the conical surface 77 of plug 72 rests against the corresponding conical seal surface 78. Thus, at rest and under the influence of spring 74, the fuel injector cannot inject fuel into the combustion chamber or cylinder. It is also evident that conical surfaces 77 and 78, acting as a valve, prevent compressed air or combustion gases from leaking back into the fuel line. However, whenever desired, (for example when the fuel pressure is increased, thus exerting pressure on the plunger) the plunger will be moved against the spring force, and the conical surface 77 will move away from seal 78 (i.e. as shown in FIG. 2) and fuel will be injected through the holes 62 of the nozzle.

It is evident that rings 54 and 56 have openings, channels or holes (not shown) or, at any rate, appropriate channels (also not shown) will exit between the fuel line and the conical plug and seal region, in order to insure free flow of the fuel.

It must now have become apparent that the present invention teaches new concepts, principles, techniques and devices, whereby internal combustion engines of the highest efficiency can be built. In addition, several other advantages of great importance are also made possible. Thus:

1. Instead of the usual fine mist, large fuel droplets are injected in the presence of excess air and under low pressure.

2. Because the size of the droplets is a function of fuel viscosity, the size of the nozzle and the pressure differential between the fuel line and the gases, the fuel is injected at a fairly low position of the combustion chamber, i.e. at a point where the pressure is relatively low. This novel injection technique not only requires lower injection pressures, but also shields the injection nozzle from the high pressures and temperatures which occur during combustion.

3. The large size of the droplets and their resistance to ignition, makes possible high compression ratios, which is a highly desirable objective heretofore impossible to realize.

4. The vortex throat is a restriction channel through which the mixture of fuel droplets and air molecules is forced to flow, at great speed and turbulence, thereby replacing the normal stratification flow by eddy current motion.

5. This turbulence, in the ignition chamber, adds the necessary energy by friction to cause the envelopes of the droplets to self-ignite.

6. The large size of the fuel droplets prevents cracking of the fuel and therefore detonation is prevented (in addition, the highly undesirable $NO_x$ is not produced).

The absence of detonation allows considerable cost and engine-weight reductions.

It is now evident that while a two-cycle internal combustion engine was abovedescribed, any other type of internal combustion engine having a variable volume chamber, including rotary, Wankel type, free-piston, etc. engines, may be suitably modified in order to adapt them to follow the teachings of the present invention. Therefore, it must be understood that the principles of the invention can be carried out by different or more complex embodiments, mechanisms and apparatuses and it is not intended to exclude any such embodiments, mechanisms and apparatuses which properly fall within the spirit and scope of this invention.

What is claimed is:

1. An internal combustion engine having a cylinder in which a piston is arranged to reciprocate, comprising:
    a. said cylinder having a closed top formed with a passageway coaxial to the axis of said cylinder;
    b. a blind and substantially spherical ignition chamber coaxial to said cylinder communicating with said cylinder through said passageway, said ignition chamber consisting of a continuously smooth, unbroken wall devoid of any mechanical elements or irregularities,
    c. said passageway having a smoothly curved convex internal wall forming a throated restriction between said cylinder and said ignition chamber;
    d. fuel-injection means disposed on the cylindrical wall of said cylinder, including means for injecting at low pressure substantially large droplets of fuel in said cylinder in the general direction of said passageway;
    e. air-admission means and exhaust means arranged on the cylindrical wall of said cylinder.

2. An internal combustion engine according to claim 1, wherein said smoothly curved convex internal wall of said passageway is gradually merging with the surface of said top and the wall of said ignition chamber.

3. An internal combustion engine according to claim 1, wherein the combination of said throated restriction and said ignition chamber are directing and urging, during the compression stroke of said piston, at least some of said fuel droplets to follow collision courses within said ignition chamber, thereby causing the elastic friction between said droplets, resulting in ignition of their surface layers.

4. An internal combustion engine according to claim 1 wherein said fuel-injection means includes:
    a. a housing communicating with the fuel line;
    b. a plunger arranged for reciprocation in said housing;
    c. a nozzle portion having several holes through which large droplets of fuel are injected;
    d. a passageway directly behind said nozzle, said plunger freely passing through said passageway and said passageway terminating in a seal portion.

5. An internal combustion engine having a cylinder in which a piston is arranged to reciprocate, comprising:
    a. said cylinder having a closed top except for an opening leading to a throated passageway, said opening and passageway being coaxial to the axis of said cylinder;
    b. a blind ignition chamber directly above said top of said cylinder, having internally the shape of a surface of revolution substantially about said axis, said chamber consisting of a continuously smooth, unbroken wall devoid of all mechanical elements or irregularities and having only one opening communicating with said passageway;

c. said throated passageway being a vortex throat having a smooth internal surface gradually curving inwardly towards said axis thus forming a restriction in said passageway and again gradually curving outwardly and away from said axis and opening-up and merging with said smooth internal walls of said ignition chamber;

d. fuel-injection means disposed on the wall of said cylinder, including means for injecting at low pressure substantially large droplets of fuel in said cylinder in the general direction of said passageway;

e. air-admission means and exhaust means arranged on the wall of said cylinder.

6. An internal combustion engine according to claim 5, including a mixture of air, admitted through said air-admission means, and fuel droplets, injected through said fuel-injection means, said mixture being compressed by said piston during the compression stroke thereby being forced through said vortex throat into said ignition chamber at great speeds, wherein the stated geometry of said throat and said ignition chamber induce at least some droplets to follow collision courses causing the elastic friction between said some droplets to ignite their surface layers.

7. The method of operating an internal combustion engine having a variable volume combustion chamber and an auxiliary ignition chamber connected to said combustion chamber through a vortex throat which comprises:

a. injecting substantially large droplets of fuel in said variable volume combustion chamber in the general direction of said ignition chamber under low pressure and in the presence of excess air;

b. compressing the mixture of droplets and air thus formed and thereby forcing said mixture to pass under pressure and great velocities through said vortex throat and into said auxiliary ignition chamber which is small, blind, chamber consisting of a continuously smooth, unbroken wall devoid of any mechanical elements or irregularities, urging said droplets to emerge under turbulence, including some collision courses, thereby causing the elastic friction between said droplets resulting in ignition of their surface layers which, in turn, produces combustion gases;

c. forcing said droplets back through said throat into said combustion chamber by expanding combustion gases;

d. gradually burning said droplets in said combustion chamber thereby releasing their energy.

8. The method of operating an internal combustion engine according to claim 7, wherein said combustion chamber is a cylinder within which a piston is arranged to reciprocate, said compressing being produced by said piston in said cylinder.

* * * * *